July 21, 1959
V. TAVONE
2,895,680
RECIPROCATING IRRIGATION SPRINKLER SYSTEM
Filed Aug. 4, 1958
2 Sheets-Sheet 1
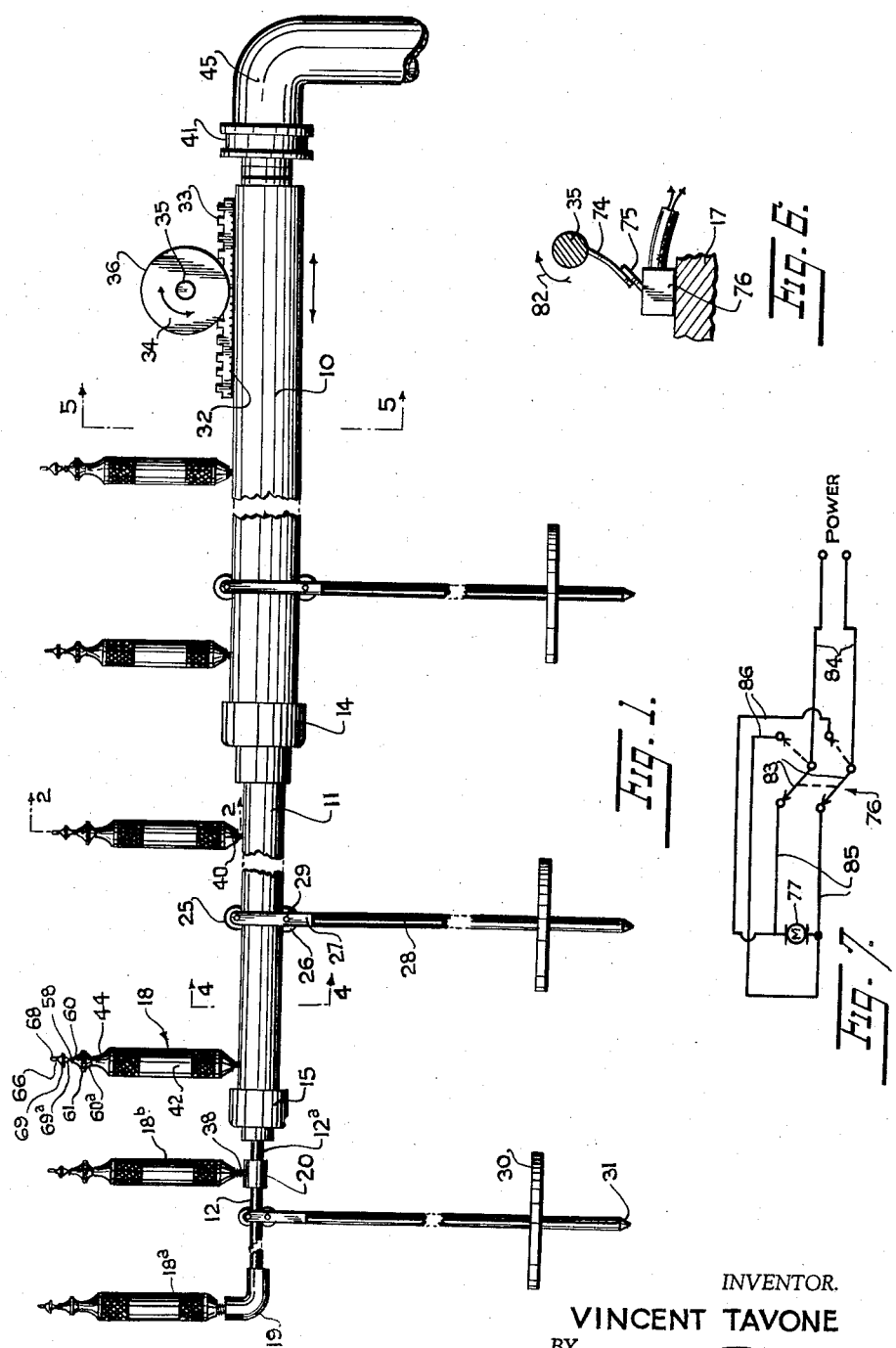
INVENTOR.
VINCENT TAVONE
BY
*Zoltan H Robchely*
ATTORNEY July 21, 1959 V. TAVONE 2,895,680
RECIPROCATING IRRIGATION SPRINKLER SYSTEM
Filed Aug. 4, 1958 2 Sheets-Sheet 2
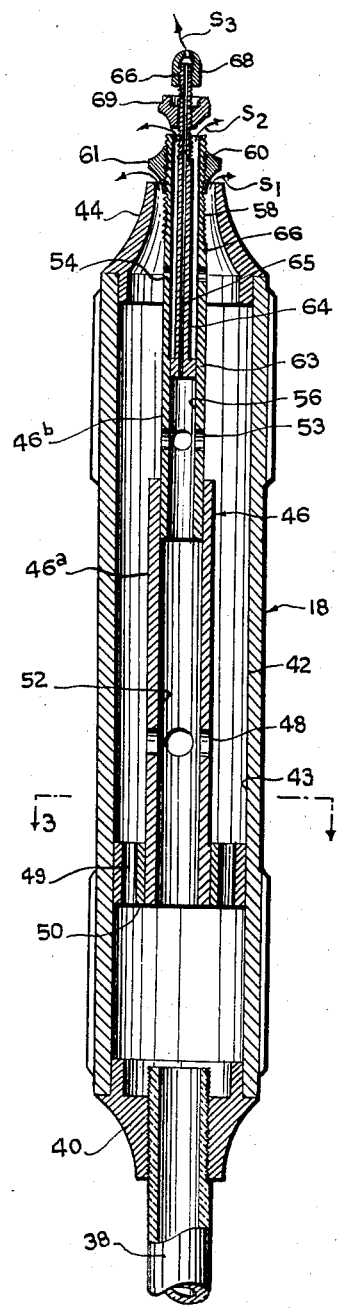
INVENTOR.
VINCENT TAVONE
BY
ATTORNEY

… … …

United States Patent Office 2,895,680
Patented July 21, 1959

2,895,680
RECIPROCATING IRRIGATION SPRINKLER SYSTEM

Vincent Tavone, East Paterson, N.J.

Application August 4, 1958, Serial No. 752,706

2 Claims. (Cl. 239—76)

This invention concerns new and useful improvements in farm and irrigation sprinklers.

The invention has for an object the construction of a sprinkler with a plurality of vertically disposed cylindrical bodies supported for back and forth movement in a vertical plane while ejecting water therefrom in a plurality of streams or sprays.

A further object is to provide a sprinkler of the character described in which each water-ejecting body includes an outer tube extending from the top of the body, a first spray-directing nut mounted upon said outer tube for controlling the spraying of water from an area around the tube and within the body, and an inner tube extending coaxially through said outer tube and provided with another spray-directing nut for controlling the spraying of water which passes between said outer and inner tubes, said inner tube having a central axial bore and provided with a perforated cap for emitting water in a fine axial stream from the inner tube.

A still further object is to provide a plurality of water-spraying bodies with a reciprocating support adapted to supply water to the bodies, said support being driven by a motor via gear means.

A still further object is to provide a reciprocating support for a water sprinkling device, said support including a plurality of coupled horizontally disposed pipes, a rack gear secured to one of the pipes, gear means engaged with the rack gear, and motor means for driving the gear means, the pipes being supported on rollers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a sprinkler device embodying the invention.

Fig. 2 is a sectional view on an enlarged scale of one water sprinkling body taken on line 2—2 of Fig. 1.

Fig. 3 is a sectional view taken on line 3—3 of Fig. 2.

Fig. 4 is a sectional view on an enlarged scale taken on line 4—4 of Fig. 1.

Fig. 5 is a sectional view taken on line 5—5 of Fig. 1.

Fig. 6 is a sectional view taken on the plane of the line 6—6 of Fig. 5 showing the mode of operation of a reversing switch, the switch being shown closed.

Fig. 7 is an electrical circuit diagram of a power supply circuit which may be employed with the device.

Referring to the drawings, there is shown a horizontally disposed pipe 10 to which is coupled in axial alignment pipes 11 and 12 by couplings 14 and 15. The successive pipes have progressively smaller diameters from pipe 10 to pipe 12. Upon each pipe is mounted one or more vertically disposed water sprinkler bodies 18. The body 18a on the end of pipe 12 is supported in an elbow 19. Body 18b is supported in a threaded fitting 20 secured to coupling 15 by a nipple 12a.

The coupled pipes are movably supported as a rigid unit in rollers 25, 26 carried in bracket 27 on posts 28. The posts have horizontal circular flanges 30 secured at intermediate portions thereof for stabilizing the posts when they are inserted in the ground in a lawn or garden. Each post terminates in a conical point 31 to facilitate penetration of the ground.

Secured by welding 32 to the top of pipe 10 is a rack gear 33. Engaged with this gear is a gear 34 having lateral flanges 36, as best shown in Figs. 1 and 5. Gear 34 is carried on a shaft 35. A water inlet pipe such as a hose 45 is removably connected to the free end of pipe 10 by a coupler 41.

The internal structure of each of the sprinkler bodies 18 is best shown in Fig. 2. Perpendicularly disposed to each of the horizontal pipes is a rigid tube or pipe 38. The upper end of pipe 38 is threaded in the lower tapered end of a fitting 40. This fitting is secured in the lower end of a cylindrical shell 42 of the sprinkler body 18. A similar tapered fitting 44 is secured in the upper end of shell 42. The open upper end of fitting 44 serves as a nozzle for ejection of water from the body. Centrally disposed in shell 42 is a first outer tube 46. This tube has lower and upper sections 46a and 46b respectively interfitted with each other. Section 46a is provided with a plurality of apertures 48 at intermediate points therein. A cylindrical web 50 is secured on the lower end of section 46a. This web, as best shown in Figs. 2 and 3, has a plurality of spaced holes or passages 49 therein. Section 46a has a central bore 52. Section 46b has two sets of apertures 53 and 54 spaced near opposite ends thereof. Section 46b has a central bore 56 and is externally threaded at its upper end 58. Threaded on end 58 is a water stream directing nut 60. This nut has a knurled outer rim 61 to facilitate turning and adjusting the nut to regulate the volume of water emitted as spray $S_1$ from the nozzle end of fitting 44. The underside of the nut is tapered inwardly at 60a so that the water is cast in a uniform 360° spray $S_1$ from the sprinkler body.

An inner tube 64 is concentrically disposed in the upper half of tube section 46b. The tube 64 has a central bore 65 and is threaded on its upper end at 66. A perforated cap 68 is threaded on the end of tube 64. The lower end of tube 64 is provided with a flange or web 63 by which the tube is secured to the wall of bore 56 in tube section 46b. Threaded on tube 64 is a second water stream directing nut 69 having a lower curved and tapered side 69a, so that the stream of water $S_2$ which is emitted from the passage 67 defined between tubes 64 and tube section 46b is cast as a uniform 360° spray around the sprinkler. A third spray $S_3$ is cast centrally upward through the opening in cap 68.

In Fig. 4 is shown a portion of post 28 which supports pipe 11 therein. Each of rollers 25 and 26 rotates on a pintle 29 journaled in bracket 27. The bracket is secured to the top of the post by nails or rivets 39. Each roller has an inner portion 70 tapered and shaped to engage the round exterior of the pipe disposed therebetween.

The reciprocating means is best shown in Figs. 5, 6 and 7. This includes the rack gear 33 secured longitudinally on top of pipe 10. Pinion gear 34 has teeth 34a engaged with the teeth of rack gear 33. Gear 34 is carried on shaft 35 which is rotatably journaled in gear box 80. The flanges 36 of gear 34 depend below the teeth of gear 33 and are juxtaposed to the sides of the rack gear so that the pipes 10, 11 and 12 are prevented from rotating as they move longitudinally responsive to reciprocation gear 33 by gear 34.

Extending radially from shaft 35 is a flexible metal or plastic finger 74. This finger is disposed to contact and move handle 75 of a reversing switch 76. The switch is in electrical circuit with a motor 77. Motor 77 has a shaft 78 operatively connected to shaft 35 via a suitable speed reduction gear assembly in gear box 80. As the shaft 35 rotates under the driving force derived from motor 77, the shaft completes a single revolution when finger 74 contacts and moves handle 75 so that the reversing switch is actuated to reverse the power supply to motor 77. Each time the finger 74 reaches handle 75 it moves it in the opposite direction. The finger is sufficiently long and flexible that it permits a slight overrun of the shaft as shown in Fig. 6, but then the shaft reverses its direction of rotation and the finger is carried around in the opposite direction as indicated by arrow 82.

In Fig. 7 is shown schematically a diagram of a power supply circuit for motor 77. Reversing switch 76 is a double-pole double-throw switch. The power supply is connected by wires 84 directly to the reversing poles 83 which are ganged together. Wires 85 and 86 connect the pole contacts of the reversing switch alternately to the motor depending on the position of the poles.

As the motor 77 rotates the rack gear is moved longitudinally back and forth so that the coupled pipes 10, 11, 12 reciprocate axially and the water sprinkler bodies 18 are carried back and forth in a vertical plane.

As the water sprinkler bodies 18 move back and forth, water is supplied through hose 45, and is emitted in plural sprays from the sprinkler bodies. A more uniform and extended area of distribution of the water is thus obtained than is possible with stationary water sprinklers.

The purpose of the reciprocating motion is to have the water sprays overlap each other and to effect an even coverage of spray water over any desired surface.

In operation of the device, nut 69 and cap 68 may be adjustably threaded on their supports to regulate the volume of the spray to pass each of these elements. The water passing out as spray $S_1$ will normally pass apertures 49 in web 50, then through the space between bore 43 in shell 42 and the tube 46. The water passing out as spray $S_2$ will enter tube section $46^b$ through apertures 54. The water passing out as spray $S_3$ will pass up bore 65 from bores 52 and 56. Some water may enter bore 56 directly through apertures 53 and some water may enter bore 56 through apertures 48.

The sprinkler body, tubes and nuts should preferably be made of bronze, brass or other non-corrosive metal. The shell 42 may be made of aluminum.

It is to be understood that the pipes 10 may be either below or above the actuating gear 34.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a farm sprinkling device, a plurality of vertically disposed hollow bodies, each body having a wall defining an upwardly directed nozzle at the upper end thereof, a circular web affixed across the interior of each body intermediate the ends thereof, said web having a plurality of spaced openings therethrough, a first hollow tube having its lower end affixed to said web, the upper end of said tube having a threaded portion projecting above the upper end of the body, the outer diameter of said upper end of the tube being less than the inner diameter of said nozzle whereby to allow passage of water therebetween, a second tube concentric with the first tube and having an outer diameter less than the inner diameter of said first tube, means fixedly mounting the lower end of said second tube within the first tube, the upper end of the second tube threaded and extending beyond the upper end of the first tube, each of said tubes having lateral apertures therein so that the interior of each tube communicates with a portion of the body beneath said web, deflector nuts threaded on the first and second tubes exteriorly of the body for adjustably constricting the spaces surrounding said tubes, a cap having an opening therein threaded on the end of said second tube, a first pipe affixed in the lower end of the body, a plurality of horizontally disposed pipes of progressively smaller diameter secured to each other in axial alignment, the first pipe of each tube secured to one of the horizontally disposed pipes, a plurality of posts carrying rollers with said horizontally disposed pipes supported on said rollers, a rack gear secured to one of the horizontally disposed pipes, gear means engaged with said rack gear, and a motor operatively connected to said gear means, said motor provided with means for reversing the direction of rotation thereof periodically at the end of each pass of the rack gear in back and forth directions.

2. In a farm sprinkling device, a plurality of vertically disposed hollow bodies, each body having a well defining an upwardly directed nozzle at the upper end thereof, a circulator web affixed across the interior of each body intermediate the ends thereof, said web having a plurality of spaced openings therethrough, a first hollow tube having its lower end affixed to said web, the upper end of said tube having a threaded portion projecting above the upper end of the body, the outer diameter of said upper end of the tube being less than the inner diameter of said nozzle whereby to allow passage of water therebetween, a second tube concentric with the first tube and having an outer diameter less than the inner diameter of said first tube, means fixedly mounting the lower end of said second tube within the first tube, the upper end of the second tube threaded and extending beyond the upper end of the first tube, each of said tubes having lateral apertures therein so that the interior of each tube communicates with a portion of the body beneath said web, deflector nuts threaded on the first and second tubes exteriorly of the body for adjustably constricting the spaces surrounding said tubes, a cap having an opening therein threaded on the end of said second tube, a first pipe affixed in the lower end of the body, a plurality of horizontally disposed pipes of progressively smaller diameter secured to each other in axial alignment, the first pipe of each tube secured to one of the horizontally disposed pipes, a plurality of posts carrying rollers with horizontally disposed pipes supported on said rollers, a rack gear secured to one of the horizontally disposed pipes, gear means engaged with said rack gear, and a motor operatively connected to said gear means, said motor provided with means for reversing the direction of rotation thereof periodically at the end of each pass of the rack gear in back and forth directions, the last-named means comprising a reversing switch electrically connected with said motor, said gear means carrying an elongated flexible member for actuating said reversing switch.

References Cited in the file of this patent
UNITED STATES PATENTS

| | | |
|---|---|---|
| 955,952 | East | Apr. 26, 1910 |
| 1,418,047 | Zerweck | May 30, 1922 |
| 2,194,071 | Hine | Mar. 19, 1940 |
| 2,226,668 | Newman | Dec. 31, 1940 |
| 2,255,688 | Tavone | Sept. 9, 1941 |
| 2,703,579 | Merancy et al. | Mar. 8, 1955 |
| 2,725,064 | Tamminga | Nov. 29, 1955 |